United States Patent
Doherty et al.

(10) Patent No.: US 8,588,184 B2
(45) Date of Patent: Nov. 19, 2013

(54) BROADBAND DATA COMMUNICATIONS NETWORK WITH BACK-UP GATEWAYS, AND ASSOCIATED METHODS

(75) Inventors: Thomas Doherty, Webster, NY (US); Andrew Ross, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 904 days.

(21) Appl. No.: 12/257,572

(22) Filed: Oct. 24, 2008

(65) Prior Publication Data
US 2010/0103884 A1 Apr. 29, 2010

(51) Int. Cl.
*H04W 4/00* (2009.01)
(52) U.S. Cl.
USPC .............................. 370/332; 370/218; 455/436
(58) Field of Classification Search
None
See application file for complete search history.

(56) References Cited

U.S. PATENT DOCUMENTS

| | | | |
|---|---|---|---|
| 7,317,707 B2 | 1/2008 | Rajkumar et al. | 370/331 |
| 7,317,708 B2 | 1/2008 | Moon et al. | 370/331 |
| 7,797,279 B1 * | 9/2010 | Starling et al. | 707/641 |
| 2007/0153986 A1 * | 7/2007 | Bloebaum et al. | 379/45 |
| 2008/0076425 A1 * | 3/2008 | Khetawat et al. | 455/436 |
| 2008/0117842 A1 * | 5/2008 | Rao | 370/310 |
| 2010/0027769 A1 * | 2/2010 | Stevens et al. | 379/88.17 |

* cited by examiner

*Primary Examiner* — Jianye Wu
(74) *Attorney, Agent, or Firm* — Allen, Dyer, Doppelt, Milbrath & Gilchrist, P.A.

(57) ABSTRACT

A broadband data communications network includes mobile wireless communications devices, base stations, and a master access gateway for operating using a full data set for controlling broadband data communications between the base stations and the mobile wireless communications devices. A back-up gateway is coupled to a given one of the base stations for communicating with the master access gateway for generating a data subset from the full data set for the given base station and associated mobile wireless communications devices when communications between the given base station and the master access gateway is available. When communications is unavailable, then the back-up gateway operates using the data subset for controlling broadband data communications between the given base station and associated mobile wireless communications devices.

21 Claims, 4 Drawing Sheets

BROADBAND DATA COMMUNICATIONS NETWORK WITH BACK-UP GATEWAYS, AND ASSOCIATED METHODS

FIELD OF THE INVENTION

The present invention relates to the field of communications networks, and more particularly, to a broadband data communications network with access gateways, such as a Worldwide Interoperability for Microwave Access (WiMAX) communications network.

BACKGROUND OF THE INVENTION

Broadband data communications networks, such as WiMAX, provides wireless data in a variety of ways, from point-to-point to full mobile cellular type access. WiMAX stands for Worldwide Interoperability for Microwave Access, and is based on the IEEE 802.16 standard.

WiMAX may be used for connecting Wi-Fi hotspots with other parts of the Internet, and for providing a wireless alternative to cable and DSL for last mile broadband access. WiMAX is a possible replacement for cellular phone technologies such as GSM and CDMA, or can be used as an overlay to increase capacity. It has also been considered as a wireless backhaul technology for 2G, 3G, and 4G networks in both developed and developing nations. Backhaul for remote cellular operations is typically provided via satellite, and in urban areas via one or more T1 connections.

A WiMAX communications network uses access service network gateways (ASN GWs) for setting up connections between base stations and mobile communications devices. Each access gateway is part of an access service network (ASN), which is typically owned by a network access provider (NAP). Each ASN communicates with a connectivity service network (CSN), which is typically owned by a network service provider (NSP). The CSN transfers data to and receives data from a data network, such as the Internet.

The CSN may operate as the home agent (HA) and may also provide the authentication, authorization and accounting (AAA) functions for the mobile communications devices. The AAA functions may be stored in an AAA server. The CSN may also directly communicate with a mobile communications device. The CSN may be considered the home CSN, and communicates with a visited CSN for internetworking therebetween, as readily appreciated by those skilled in the art.

Communications between an access gateway and the base stations need highly reliable connections therebetween. However, this is not always the case. If such a connection is lost, then basic functions such establishing user device connectivity, maintaining user device connectivity, and providing handoff to another base station are not available.

U.S. Pat. No. 7,317,707 to Rajkumar et al. discloses a method for seamless session transfer of a mobile communications device within a WiMAX communications network. In the method, a source base station sends first information to a target base station. The first information indicates a sequence number of a first data unit in a sequence of data units undelivered to the mobile station by the source base station. The source base station also sends the target base station second information. The second information indicates data units, after the first undelivered data unit in the sequence, that have been delivered to the mobile station by the source base station. The second information may further indicate portions of the first undelivered data unit that have been delivered to the mobile station by the source base station.

U.S. Pat. No. 7,317,708 to Moon et al. discloses a method and apparatus for providing indoor and outdoor wireless access in a broadband data communications network, such as a WiMAX communications network. A mobile WiMAX bridge serves as an access point (AP) of a wireless local area network (WLAN) (e.g., a wireless fidelity (WiFi) system or Mobile WiMAX system) for an indoor network, and simultaneously serves as an access point (AP) of a mobile WiMAX system for an outdoor network.

There is still a need to provide reliable communications between an access gateway and base stations. If reliable communications is not available, then basic functions for the mobile communications devices operating within a broadband data communications network are not available.

SUMMARY OF THE INVENTION

In view of the foregoing background, it is therefore an object of the present invention to reduce the impact of a lost connection between a base station and an access gateway for a broadband data communications network, such as a WiMAX system.

This and other objects, features, and advantages in accordance with the present invention are provided by a broadband data communications network comprising mobile wireless communications devices, base stations for broadband data communications with the mobile wireless communications devices, and a master access gateway for operating using a full data set for controlling broadband data communications between the base stations and the mobile wireless communications devices.

A back-up gateway may be coupled to a given one of the base stations for communicating with the master access gateway for generating a data subset from the full data set for the given base station and associated mobile wireless communications devices when communications between the given base station and the master access gateway is available. When communications between the given base station and the master access gateway is unavailable, then the back-up gateway may operate using the data subset for controlling broadband data communications between the given base station and associated mobile wireless communications devices. The back-up gateway advantageously reduces the impact of a lost connection between a base station and a master access gateway for a broadband data communications network.

The broadband data communications network may be a Worldwide Interoperability for Microwave Access (WiMAX) communications network, for example. Consequently, the master access gateway and the base stations may operate based on a Profile C configuration when communications therebetween is available, and the back-up gateway coupled to the given base station may operate based on a Profile B configuration when communications between the given base station and the master access gateway is unavailable.

Since connections between a base station and a master access gateway in Profile C may be unreliable or non-existent at times, the back-up gateway advantageously maintains full capabilities by allowing the base station to revert to a Profile B configuration. While connectivity is present between the base station and the master access gateway in Profile C, the back-up gateway may replicate the necessary information (i.e., generate the data subset) to allow mobile communications devices to continue receiving services from the base station, and to allow new mobile communication devices to join and obtain services from the base station.

The back-up gateway may be co-located with the given base station. The back-up gateway may periodically update the data subset when communications between the given base station and the master access gateway is available. The back-up gateway may comprise a controller for monitoring communications between the given base station and the master access gateway, and if communications therebetween is unavailable, then the controller may cause the back-up gateway to operate using the data subset for controlling broadband data communications between the given base station and associated mobile wireless communications devices.

The data subset may comprise data for authenticating the associated mobile wireless communications devices as valid devices when communications between the given base station and the master access gateway is unavailable.

The data subset may comprise data for authorizing different types of services to the associated mobile wireless communications devices when communications between the given base station and the master access gateway is unavailable. The different types of services may comprise IP address filtering, address assignment, route assignment, bandwidth control and encryption, for example.

The data subset may comprise data for handing off the associated mobile wireless communications devices from the given base station to another base station when communications between the given base station and the master access gateway is unavailable.

The data subset may comprise data for determining a location of an idle mobile wireless communications device associated with the given base station so that the idle wireless communications device can be alerted when there is an incoming message.

Another aspect of the present invention is directed to a method for operating a broadband data communications network as described above. The method may comprise operating the master access gateway using a full data set for controlling broadband data communications between the base stations and the mobile wireless communications devices, and operating the back-up gateway coupled to the given base stations for communicating with the master access gateway for generating a data subset from the full data set for the given base station and associated mobile wireless communications devices when communications between the given base station and the master access gateway is available. When communications between the given base station and the master access gateway is unavailable, then the back-up gateway may control broadband data communications between the given base station and associated mobile wireless communications devices based on the generated data subset.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
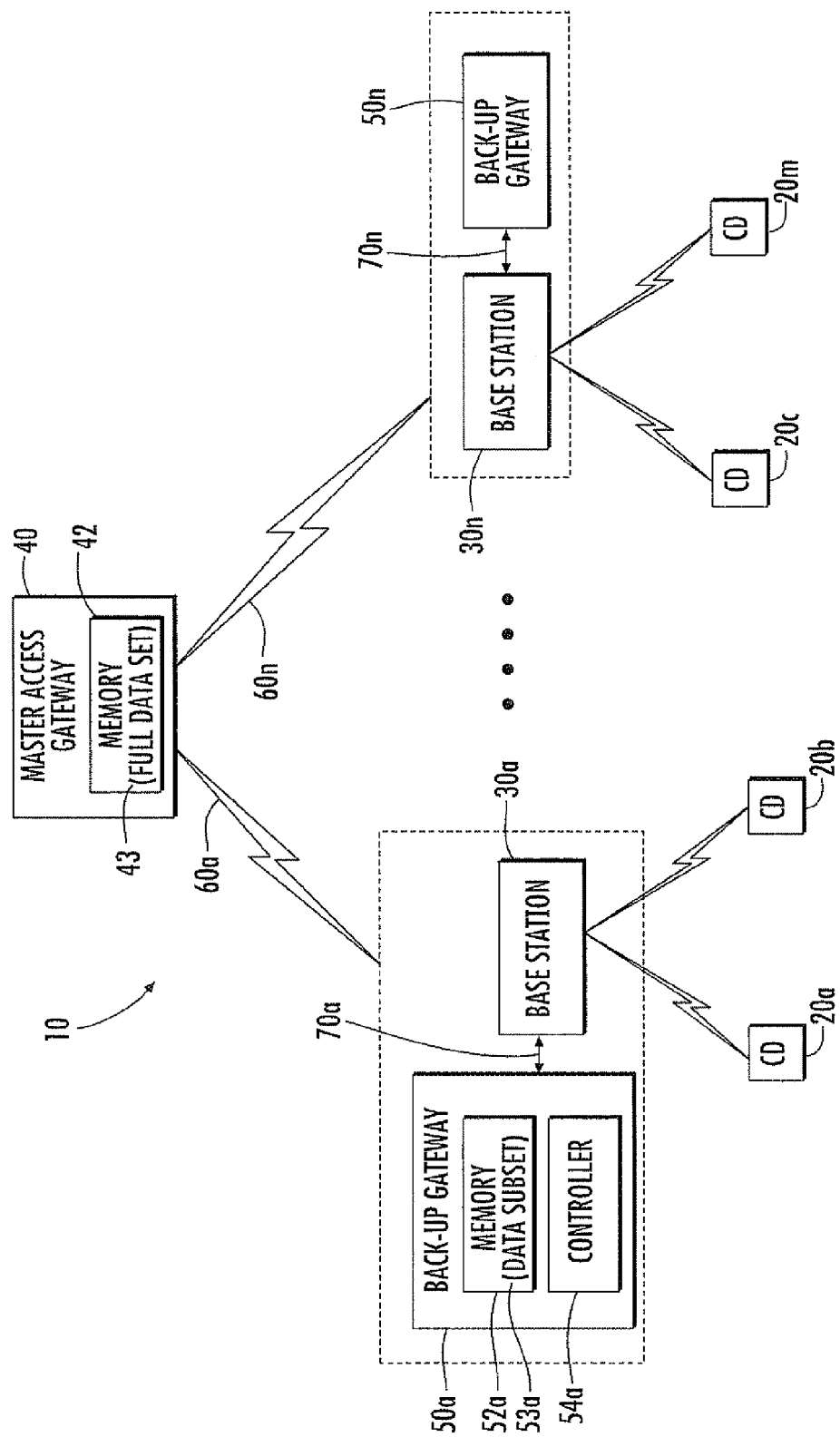
FIG. 1 is a block diagram of a broadband wireless access network with back-up gateways generating back-up information when connections between the master access gateway and the base stations are available in accordance with the present invention.
Figure 2:
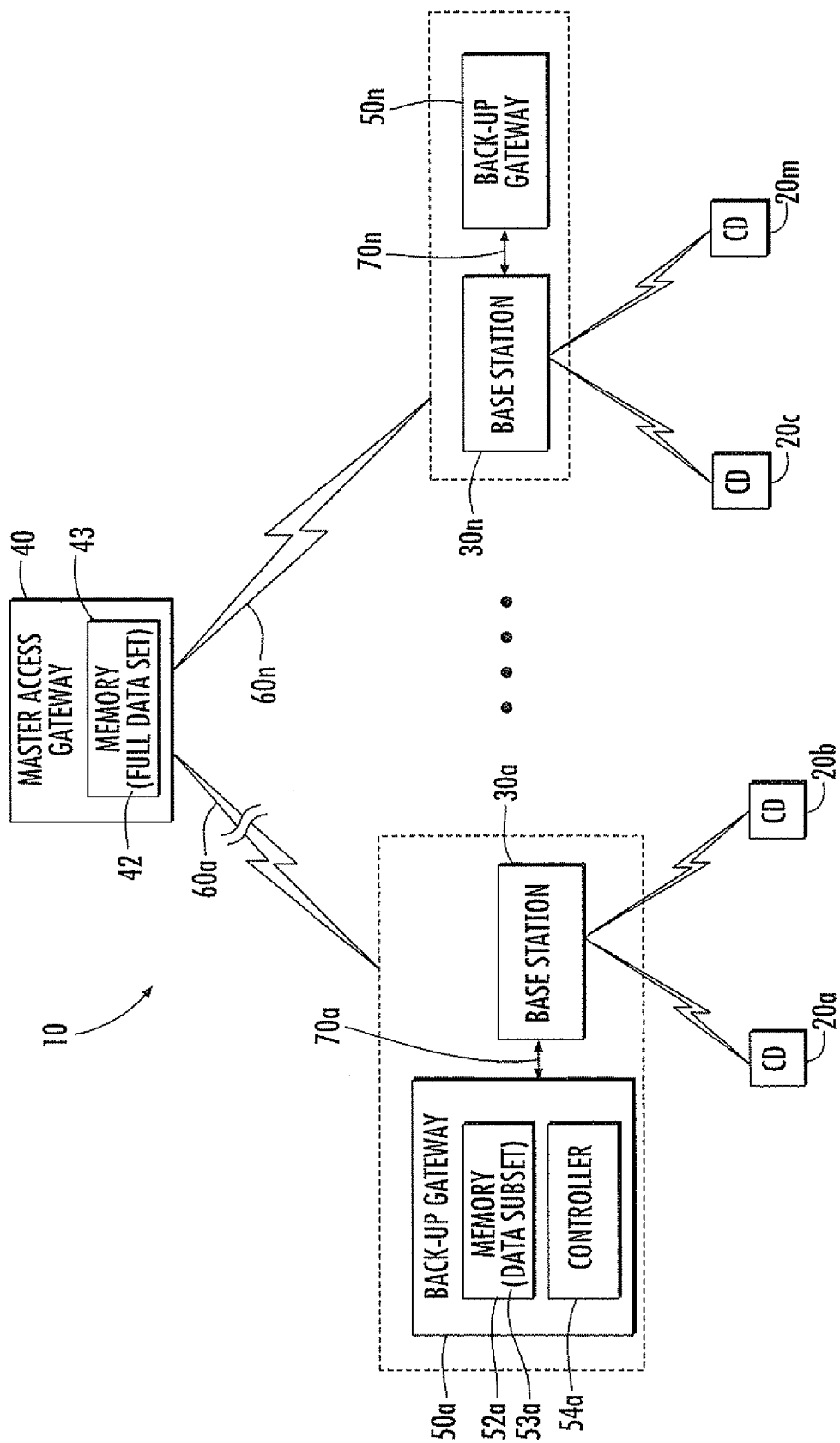
FIG. 2 is a block diagram of a broadband wireless access network with the back-up gateways controlling communications between the base stations and the mobile communications devices when connections between the master access gateway and the base stations are not available in accordance with the present invention.

Referring initially to FIGS. 1 and 2, a broadband data communications network 10 comprises a plurality of mobile wireless communications devices $20a$-$20m$, a plurality of base stations $30a$-$30n$ for broadband data communications with the mobile wireless communications devices, and a master access gateway 40 for operating using a full data set 42 for controlling broadband data communications between the base stations and the mobile wireless communications devices. The full data set 42 is stored in a memory 43 within the master access gateway 40. Back-up gateways $50a$-$50n$ are coupled to the base stations $30a$-$30n$.

A back-up gateway $50a$ is coupled to a given base station $30a$ for communicating with the master access gateway 40 for generating a data subset $52a$ from the full data set 42 for the given base station $30a$ and associated mobile wireless communications devices $20a$, $20b$ when communications between the given base station and the master access gateway is available. The data subset $52a$ is stored in a memory $53a$ within the back-up gateway $50a$. When communications between the given base station $30a$ and the master access gateway 40 is unavailable, then the back-up gateway $50a$ operates using the data subset $52a$ for controlling broadband data communications between the given base station $30a$ and associated mobile wireless communications devices $20a$, $20b$.

The back-up gateway $52a$ advantageously reduces the impact of a lost connection $60a$ between a base station $30a$ and a master access gateway 40 for a broadband data communications network 10. As illustrated in FIG. 1, links $60a$-$60n$ indicate that communications between the base stations $30a$-$30n$ and the master access gateway 40 is available. However, as illustrated in FIG. 2, the link $60a$ is not available for base station $30a$, whereas the links $60b$-$60n$ are available for base stations $30b$-$30n$. In accordance with the present invention, the back-up gateway $50a$ is controlling the base station $30a$ via connection $70a$ in FIG. 2. In any of the links $60b$-$60n$ fail, then the back-up gateways $50a$-$50n$ communicate with their respective base station $30b$-$30n$ via a corresponding connection $70b$-$70n$ for controlling broadband data communications between the respective base station and associated mobile wireless communications devices.

The illustrated broadband data communications network 10 may be a Worldwide Interoperability for Microwave Access (WiMAX) communications network, for example. The master access gateway 40 and the base stations $30a$-$30n$ may operate based on a Profile C configuration when communications therebetween is available. Links $60a$-$60n$ illustrate in FIG. 1 that communications between the base stations $30a$-$30n$ and the master access gateway 40 is available. The back-up gateways $50a$-$50n$ generate the data subset $52a$-$52n$ from the full data set 42. The data subsets 52a-52n are periodically updated when the links 60a-60n are available. When link 60a is not available, as illustrated in FIG. 2, for example, then the back-up gateway 50a is operating via connection 70a using the data subset for controlling broadband data communications between the given base station 30a and associated mobile wireless communications devices 20a, 20b.

Links 60a-60n are based on a defined interface. For a WiMAX communications network, this is an R6 interface. The R6 interface is considered an open interface since the wireless communications from the master access gateway 40 is received by all of the base stations 30a-30n. The respective interfaces 70a-70n between the back-up gateways 50a-50n and the base stations 30a-30n are also R6 interfaces, but they are closed interfaces since the wireless communications from anyone of the back-up gateways is only received by the given base station coupled thereto.

The back-up gateway 50a is co-located with a given base station 30a. The connection 70a between the back-up gateway 50a and the given base station 30a may be wired or wireless. The back-up gateway 50a comprises a controller 54a for monitoring communications (i.e., link 60a) between the given base station 30a and the master access gateway 40. The controller 54a may monitor the link 60a based on measured signal qualities. The measured respective signal qualities may comprise at least one of a received signal strength indication, a carrier-to-interference ratio, an energy-per-bit ratio, and a signal-to-noise ratio. If the controller 54a determines that communications therebetween is unavailable, then the controller 54a causes the back-up gateway 50a to operate using the data subset 52a for controlling broadband data communications between the given base station 30a and associated mobile wireless communications devices 20a, 20b over connection 70a.

Since the connection 60a between the base station 30a and the master access gateway 40 in Profile C may be unreliable or non-existent at times, the back-up gateway 50a advantageously maintains full capabilities by allowing the base station 30a to revert to a Profile B configuration. While connectivity 60a is present between the base station 30a and the master access gateway 40 in Profile C, the back-up gateway 50a replicates the necessary information (i.e., the data subset 52a) to allow mobile wireless communications devices 20a, 20b to continue receiving services from the base station 30a, and to allow new mobile communication devices to join and obtain services from the base station 30a.

The data subset 52a advantageously allows the back-up gateway 50a to replace the master access gateway 40 when communications between the master access gateway and the given base station 30a is unavailable. The data normally available at the master access gateway 40 is made available by the back-up gateway 50a as it relates to the given base station 30a. The data supporting the other base stations 30b-30n may be different from the data supporting the given base station 30a, for example. The data subset 52a may include data for authenticating the associated mobile wireless communications devices 20a, 20b as valid devices when communications between the given base station 30a and the master access gateway is unavailable.

The data subset 52a may include data for authorizing different types of services to the associated mobile wireless communications devices 20a, 20b. For example, the different types of services may include IP address filtering, address assignment, route assignment, bandwidth control and encryption. In addition, the data subset may include data for handing off the associated mobile wireless communications devices 20a, 20b from the given base station 30a to another base station 30b. The data subset may include data for determining a location of an idle mobile wireless communications device 20b associated with the given base station 30a so that the idle wireless communications device can be alerted when there is an incoming message. This is also known as paging.

Figure 3:
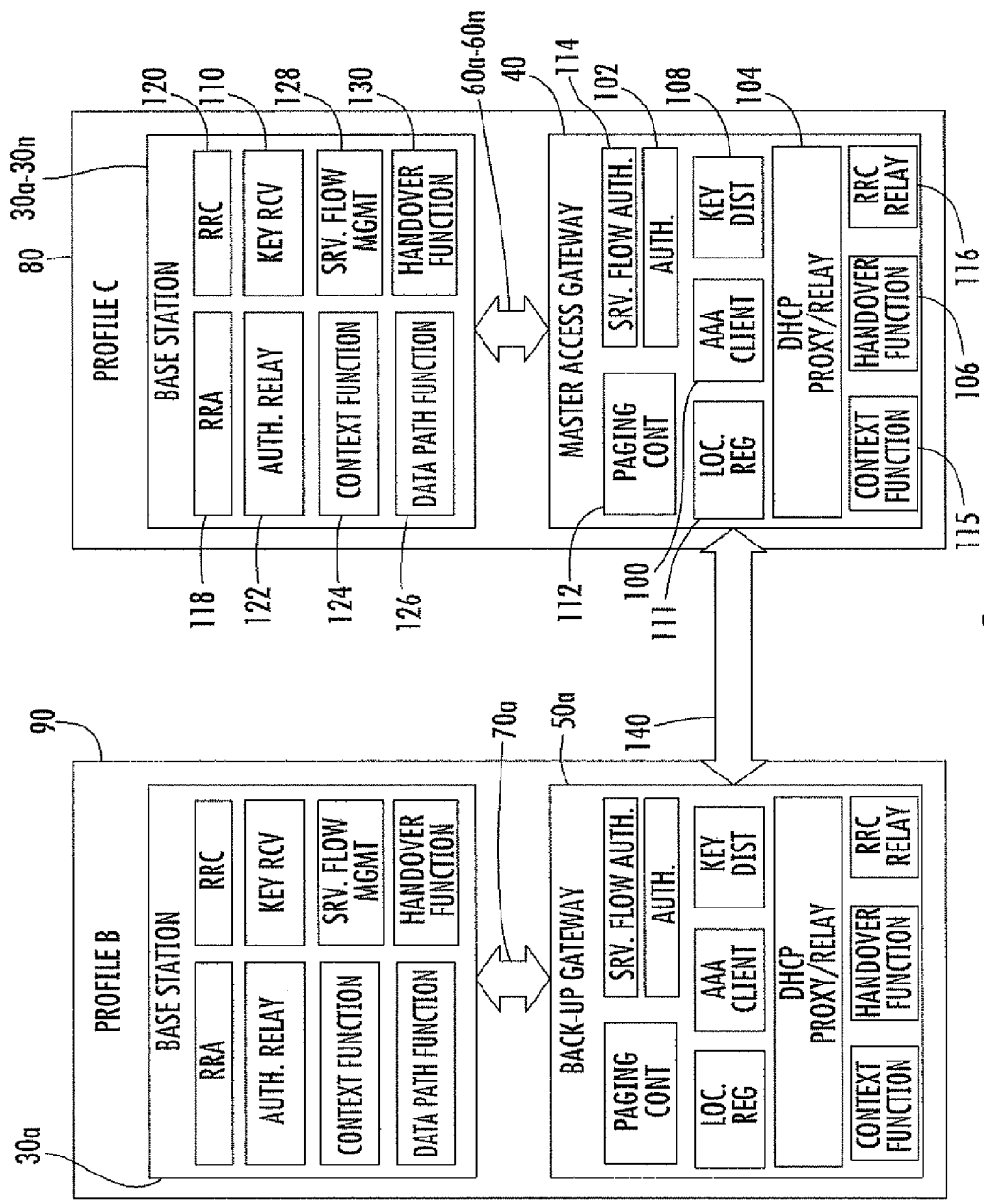
FIG. 3 is a block diagram comparing the distribution of functions for a base station/master access gateway operating in a Profile C configuration with a base station/back-up gateway operating in a Profile B configuration in accordance with the present invention.

The distribution of functions for base stations/master access gateway operating in a Profile C configuration with a base station/back-up gateway operating in a Profile B configuration will now be discussed in reference to FIG. 3. The Profile C configuration for the master access gateway 40 and the base stations 30a-30n is indicated by block 80. Similarly, the Profile B configuration for the back-up gateway 50a and its corresponding base station 30a is indicated by block 90.

Profile C is based on a centralized management. The AAA client function 100 submits a request for authentication from a mobile communications device 20a to a AAA server. Although not shown, the AAA server is coupled to the master access gateway 40. AAA stands for Authentication, Authorization, Accounting. Authentication refers to the confirmation that a user device requesting services is a valid user of the network services requested. Authentication is accomplished by the presentation of an identity and credentials. Authorization refers to the granting of specific types of service (including "no service") to a user device, based on their authentication, what services they are requesting, and the current system state.

Authorization may be based on restrictions, such as time-of-day restrictions, physical location restrictions, or restrictions against multiple logins by the same user, for example. Authorization determines the nature of the service that is granted to a user device. Examples of types of service include, but are not limited to: IP address filtering, address assignment, route assignment, quality of service (QoS)/differential services, bandwidth control/traffic management, compulsory tunneling to a specific endpoint, and encryption.

Accounting refers to the tracking of the consumption of network resources by users. This information may be used for billing and planning. Online accounting refers to accounting information that is delivered concurrently with the consumption of the resources, e.g., prepaid services. Offline accounting refers to accounting information that is saved until it is delivered at a later time. Typical information that is gathered in accounting is the identity of the user, the nature of the service delivered, when the service began, and when it ended.

The Authenticator function 102 is an authentication system that physically allows or blocks access to the network. The Dynamic Host Configuration Protocol (DHCP) Proxy/Relay function 104 provides a fully functional DHCP server and client, i.e., a mobile wireless communications device. The mobile wireless communications device side establishes leases from a server on one interface and keeps these addresses in a pool. On another interface, the server side of the implementation provides leases to mobile wireless communications devices using the pool of addresses. The DHCP relay listens for local broadcast messages from mobile wireless communications devices and forwards these messages on another network towards a DHCP server. When the DHCP server responds, the relay forwards the reply back to the client.

The handoff function 106 handles a mobile wireless communications device 20a switching from one base station 30a to another base station 30b. A soft handoff uses a make-before-break approach where a connection to the next base station 30b is established before the mobile wireless communications device 20a leaves an ongoing connection to a base station 30a. This technique is suitable to handle voice and other latency-sensitive services such as streaming video.

When used for delivering data traffic such as web browsing or email, a soft handoff will result in lower spectral efficiency since this type of traffic is bursty and does not require continuous traffic flow from one base station 30a to another. A hard handoff uses a break-before-make approach where a connection with a base station 30a is ended before a mobile wireless communications device 20a switches to another base station 30b. A hard handoff is more bandwidth efficient but causes a longer delay.

A key distributor function 108 is a key holder for both MSK and PMK resulting from an EAP exchange. It derives Authorization Key (AK) and creates Authorization Key Identifier (AKID) for a mobile wireless communications device 20a, 20b pair and distributes the AK to the key receivers 110 in the base stations 30a-30n using an AK transfer protocol.

The location register 111 is a database that contains the location information of idle mode mobile wireless communications devices 20a-20n. The paging controller function 112 administrates the activities of an idle mode mobile wireless communications device 20a.

The Service Flow Authorization (SFA) function 114 is used to enforce ASN-level policy decisions using a local policy database and an associated local policy function. It is used to receive service flow establishment requests from policy functions and communicates appropriate action with service flow management. SFA translates service description parameters from the policy functions into ASN 802.16-2005e format and the appropriate service profiles, for example.

The context function 115 addresses the exchanges required to retrieve or set up any state in the network elements. The radio resource control relay function 116 supports radio resource management. At the base stations 30a-30n, the radio relay agent (RRA) function 118 and radio relay control (RRC) function 120 support the radio resource control relay function 116 at the master access gateway 40. The other corresponding functions at the base stations 30a-30n include authorization relay 122, context function 124, data path function 126, service flow management 128 and handover function 130.

While connectivity is present between the base station 30a and the master access gateway 40, the back-up gateway 50a replicates the necessary information (i.e., the data subset) as represented by arrow 140 to allow mobile wireless communications devices 20a, 20b to continue receiving services from the base station 30a and to allow new mobile communication devices to join and obtain services from the base station.

Figure 4:
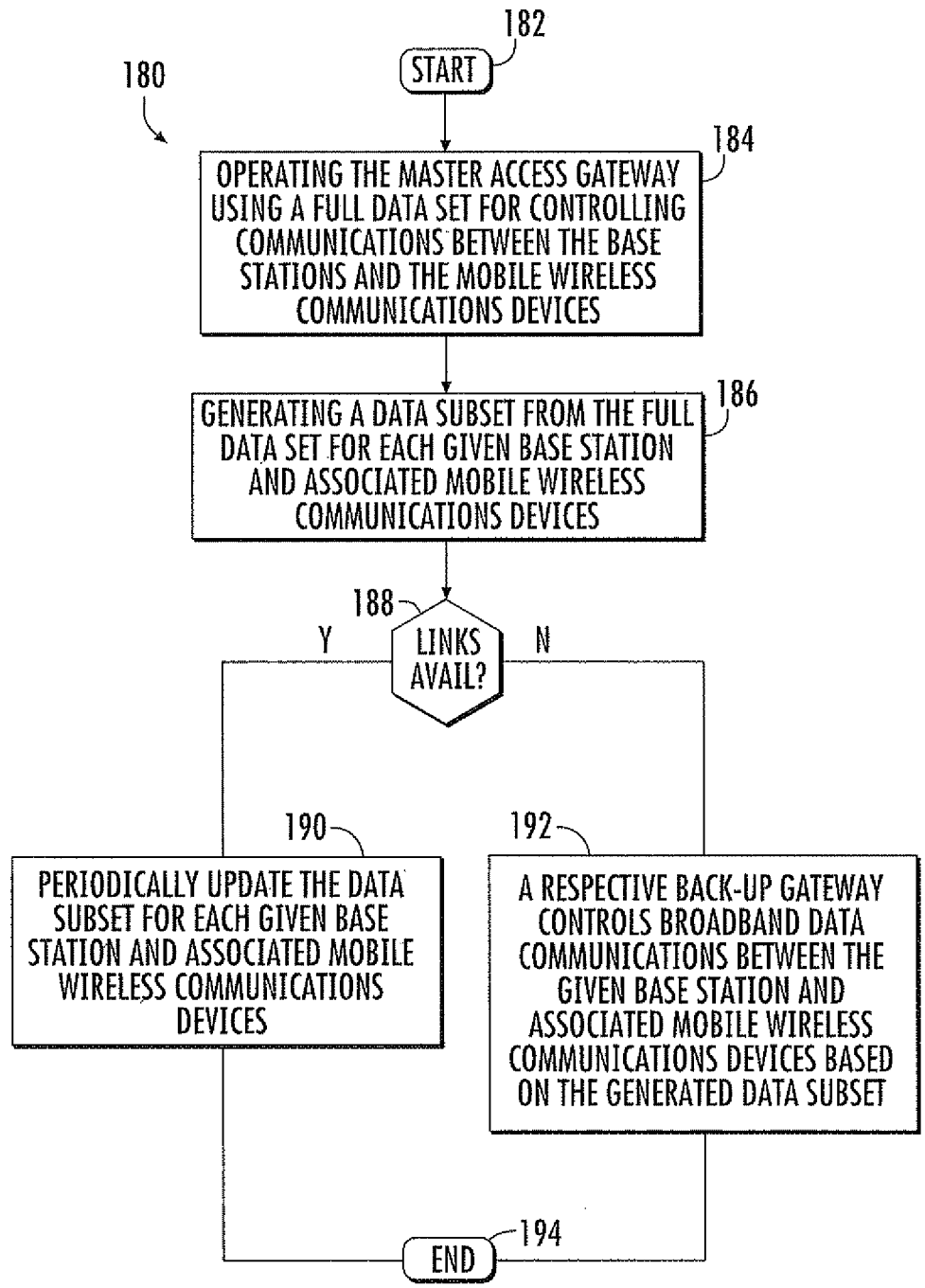
FIG. 4 is a flow chart illustrating a method for operating a broadband access network with back-up gateways in accordance with the present invention.

Referring now additionally to the flowchart 180 of FIG. 4, another aspect of the invention is directed to a method for operating a broadband data communications network 10 as described above. From the start (Block 182), the method comprises operating the master access gateway 40 using a full data set 42 for controlling broadband data communications between the base stations 30a-30n and the mobile wireless communications devices 20a-20n at Block 184. The back-up gateways 50a-50n generate their respective data subsets 52a-52n from the full data set 42 at Block 186.

A determination is made by each back-up gateway 50a-50n at Block 188 on whether or not communications is available for each link 60a-60n between the master access gateway 40 and the corresponding base stations 30a-30n.

If communications is available, then the back-up gateways 50a-50n periodically update their respective data subsets 52a-52n from the full data set 42 at Block 190. If communications is not available over anyone of the links 60a-60n, such as link 60a, then the back-up gateway 50a controls broadband data communications at Block 192 between the given base station 30a and associated mobile wireless communications devices 20a, 20b based on the generated data subset 52a. The method ends at Block 194.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A broadband data communications network comprising:
   a plurality of mobile wireless communications devices;
   a plurality of base stations configured for broadband data communications with said mobile wireless communications devices;
   a master access gateway configured to control broadband data communications between said base stations and said mobile wireless communications devices using a full data set; and
   a back-up gateway coupled to a given one of said base stations and configured to
   communicate with said master access gateway to generate a data subset from the full data set for said given base station and associated mobile wireless communications devices when communications between said given base station and said master access gateway is available, with the data subset being less than the full data set and comprising data for authenticating the associated mobile wireless communications devices as valid devices for broadband data communications with said given base station, and
   control broadband data communications between said given base station and the associated mobile wireless communications devices using the data subset when communications between said given base station and said master access gateway is unavailable based on measured signal qualities of the communications received from said master access gateway, with the control comprising authenticating the associated mobile wireless communications devices as valid devices based on the data subset for broadband data communications with said given base station.

2. The broadband data communications network according to claim 1 wherein said master access gateway and said plurality of base stations are configured to operate based on a configuration providing centralized management capabilities when communications therebetween is available; and wherein said back-up gateway coupled to said given base station is configured to provide replicated management capabilities when communications between said given base station and said master access gateway is unavailable.

3. The broadband data communications network according to claim 1 wherein said back-up gateway coupled to said given base station is configured to periodically update the data subset when communications between said given base station and said master access gateway is available.

4. The broadband data communications network according to claim 1 wherein said back-up gateway comprises a controller configured to monitor communications between said given base station and said master access gateway, and if communications therebetween is unavailable based the measured signal qualities of the communications received from said master access gateway, then said controller is configured to cause said back-up gateway to operate using the data subset for controlling broadband data communications between said given base station and associated mobile wireless communications devices.

5. The broadband data communications network according to claim 1 wherein the data subset comprises data operative to authenticate the associated mobile wireless communications devices as valid devices when communications between said given base station and said master access gateway is unavailable.

6. The broadband data communications network according to claim 1 wherein the data subset comprises data operative to authenticate different types of services to the associated mobile wireless communications devices when communications between said given base station and said master access gateway is unavailable, with the different types of services comprising at least one of IP address filtering, address assignment, route assignment, bandwidth control and encryption.

7. The broadband data communications network according to claim 1 wherein the data subset comprises data operable for handing off the associated mobile wireless communications devices from said given base station to another base station when communications between said given base station and said master access gateway is unavailable.

8. The broadband data communications network according to claim 1 wherein the data subset comprises data operable for determining a location of an idle mobile wireless communications device associated with said given base station so that the idle wireless communications device can be alerted when there is an incoming message.

9. The broadband data communications network according to claim 1 wherein said back-up gateway is co-located with said given base station.

10. A Worldwide Interoperability for Microwave Access (WiMAX) communications network comprising:
a plurality of mobile wireless communications devices;
a plurality of base stations configured for broadband data communications with said mobile wireless communications devices;
a master access gateway configured to control broadband data communications between said base stations and said mobile wireless communications devices using a full data set based on a configuration providing centralized management capabilities; and
a back-up gateway coupled to a given one of said base stations and configured to
communicate with said master access gateway to generate a data subset from the full data set for said given base station and associated mobile wireless communications devices when communications between said given base station and said master access gateway is available, with the data subset being less than the full data set and comprising data for authenticating the associated mobile wireless communications devices as valid devices for broadband data communications with said given base station, and
control broadband data communications between said given base station and the associated mobile wireless communications devices using the data subset based on a configuration providing replicated management capabilities when communications between said given base station and said master access gateway is unavailable based on measured signal qualities of the communications received from said master access gateway, with the control comprising authenticating the associated mobile wireless communications devices as valid devices based on the data subset for broadband data communications with said given base station.

11. The WiMAX communications network according to claim 10 wherein said back-up gateway coupled to said given base station is configured to perform the following:
periodically update the data subset when communications between said given base station and said master access gateway is available; and
monitor communications between said given base station and said master access gateway, and if communications therebetween is unavailable, then cause said back-up gateway to operate using the data subset for controlling broadband data communications between said given base station and associated mobile wireless communications devices.

12. The WiMAX communications network according to claim 10 wherein the data subset comprises data operative to authenticate different types of services to the associated mobile wireless communications devices when communications between said given base station and said master access gateway is unavailable, with the different types of services comprising at least one of IP address filtering, address assignment, route assignment, bandwidth control and encryption.

13. The WiMAX communications network according to claim 10 wherein the data subset comprises data operable for handing off the associated mobile wireless communications devices from said given base station to another base station when communications between said given base station and said master access gateway is unavailable.

14. The WiMAX communications network according to claim 10 wherein the data subset comprises data operable for determining a location of an idle mobile wireless communications device associated with said given base station so that the idle wireless communications device can be alerted when there is an incoming message.

15. The WiMAX communications network according to claim 10 wherein said back-up gateway is co-located with said given base station; and said master access gateway communicates with said base stations over an open interface, and said back-up gateway communicates with said given base station over a closed interface.

16. A method for operating a broadband data communications network comprising a plurality of mobile wireless communications devices; a plurality of base stations for broadband data communications with the mobile wireless communications devices; a master access gateway for communicating with the plurality of base stations; and a back-up gateway coupled to a given one of the base stations, the method comprising:
operating the master access gateway using a full data set for controlling broadband data communications between the base stations and the mobile wireless communications devices; and
operating the back-up gateway coupled to the given base stations for
communicating with the master access gateway for generating a data subset from the full data set for the given base station and associated mobile wireless communications devices when communications between the given base station and the master access gateway is available, with the data subset being less than the full data set and comprising data for authenticating the associated mobile wireless communications devices as valid devices for broadband data communications with said given base station, and controlling broadband data communications between the given base station and the associated mobile wireless communications devices based on the generated data subset when communications between the given base station and the master access gateway is unavailable based on measured signal qualities of the communications received from the master access gateway, with the controlling comprising authenticating the associated mobile wireless communications devices as valid devices based on the data subset for broadband data communications with said given base station.

17. The method according to claim 16 further comprising:
periodically updating the data subset when communications between the given base station and the master access gateway is available; and
monitoring communications between the given base station and the master access gateway, and if broadband data communications therebetween is unavailable, then causing the back-up gateway to operate using the data subset for controlling broadband data communications between the given base station and associated mobile wireless communications devices.

18. The method according to claim 17 wherein the data subset comprises data for authenticating the associated mobile wireless communications devices as valid devices when communications between the given base station and the master access gateway is unavailable.

19. The method according to claim 17 wherein the data subset comprises data for authorizing different types of services to the associated mobile wireless communications devices when communications between the given base station and the master access gateway is unavailable, with the different types of services comprising at least one of IP address filtering, address assignment, route assignment, bandwidth control and encryption.

20. The method according to claim 17 wherein the data subset comprises data for handing off the associated mobile wireless communications devices from the given base station to another base station when communications between the given base station and the master access gateway is unavailable.

21. The method according to claim 17 wherein the data subset comprises data for determining a location of an idle mobile wireless communications device associated with the given base station so that the idle wireless communications device can be alerted when there is an incoming message.

* * * * *